United States Patent [19]

Park et al.

[11] Patent Number: 4,915,574

[45] Date of Patent: Apr. 10, 1990

[54] OBSTACLE DETECTOR

[75] Inventors: Joon Park, Glendale; Han Leung, Los Angeles, both of Calif.

[73] Assignee: Hughes Aircraft Company, Los Angeles, Calif.

[21] Appl. No.: 250,878

[22] Filed: Sep. 29, 1988

[51] Int. Cl.$^4$ .............................................. B25J 19/00
[52] U.S. Cl. ...................................... 414/680; 901/49; 901/29; 901/45; 901/46; 414/730; 414/735
[58] Field of Search .............. 414/680, 729, 735, 730; 901/29, 45, 46, 49

[56] References Cited

U.S. PATENT DOCUMENTS

| | | | |
|---|---|---|---|
| 4,179,783 | 12/1979 | Inoyama et al. | 901/46 X |
| 4,328,621 | 5/1982 | Benjamin | 901/46 X |
| 4,540,331 | 10/1985 | Stanner et al. | 901/49 X |
| 4,639,184 | 1/1987 | Knasel et al. | 901/49 X |
| 4,655,674 | 4/1987 | Kohler et al. | 901/49 X |
| 4,673,329 | 6/1987 | Kato | 901/28 X |
| 4,700,932 | 10/1987 | Katsuno | 901/49 X |
| 4,714,865 | 12/1987 | Chin et al. | 901/49 X |
| 4,717,003 | 1/1988 | McCormick et al. | 901/49 X |
| 4,741,642 | 5/1988 | Carlton | 901/49 X |
| 4,786,769 | 11/1988 | Knasel et al. | 901/49 X |
| 4,797,564 | 1/1989 | Ramunas | 901/41 X |
| 4,821,584 | 4/1989 | Lembke | 310/338 X |

FOREIGN PATENT DOCUMENTS 0253001  1/1988  Fed. Rep. of Germany ... 901/49 X

*Primary Examiner*—Frank E. Werner
*Assistant Examiner*—James T. Eller, Jr.
*Attorney, Agent, or Firm*—Leonard A. Alkov; Wanda Denson-Low

[57] ABSTRACT

The obstacle detector (24) has an upper plate (32) which mounts on the arm (22) of the positioning machine. At least three springs (50) pull the lower plate (34) upward and three projections such as balls (36) provide precise location of the lower plate (34). Lateral force causes actuation of switch (60) to terminate motion of the positioning machine. Vertical impact is sensed by upward motion of outer ball slide (68), which is resiliently held down against stop shoulder (76). The handling device has its foot (74) mounted on the bottom of the outer ball slide.

8 Claims, 3 Drawing Sheets

OBSTACLE DETECTOR

FIELD OF THE INVENTION

This invention is directed to a detector which senses when a device for picking up, grasping and positioning parts runs into an obstruction.

BACKGROUND OF THE INVENTION

Assembly requires the placement of one part upon another. In the past, this has been manually accomplished, particularly in those cases where small parts of different sizes and shapes were to be placed upon different locations on a larger support. Automated assembly technology originated in the placement of the same size part in the same location, and then proceeded to placement of the same size part in different locations. This type of assembly is particularly practiced on a printed wiring board where complex wiring interconnections can be provided by etched conductive leads on a dielectric board. Components are placed in position on the printed wiring board and are connected to the leads thereon. In handling such components, most of the prior art developments were in the category of dedicated tooling, where the tooling is designed to perform one function or handle components of a single size. Such dedicated tooling is expensive, if it can only be used in such a limited manner Technical development has resulted in finger systems and other part-handling devices which can pick-and-place devices of various sizes and styles. One problem associated with all pick-and-place automatic equipment is that the program may have an error therein or there may be an unexpected obstacle on the path of the pickup device. When the pickup fingers run into an obstacle, the fingers may be damaged and the obstacle may be damaged. In either case, there will be a loss in productivity due to machine down time and due to equipment and/or part damage. There is a need to be able to terminate the movement of a pick-and-place machine when an obstacle is encountered.

SUMMARY OF THE INVENTION

In order to aid in the understanding of this invention, it can be stated in essentially summary form that it is directed to an obstacle detector wherein upper and lower mounting plates are mounted with respect to each other so that the upper mounting plate may be attached to the arm of the positioning machine and the lower mounting plate can carry the handling devices or fingers thereon. The upper and lower mounting plates are attached so that the lower mounting plate is resiliently retained in a neutral position with respect to the upper mounting plate. When the lower mounting plate is forced away from this neutral position, a sensor indicates obstruction detection so that the positioning machine can be stopped before damage occurs.

It is thus a purpose and advantage of this invention to provide an obstacle detector which can be mounted upon an automatic positioning arm with pickup fingers or part handling devices mounted upon the obstacle detector so that, when the pickup fingers or part-handling devices hit an obstruction, the positioning arm can be stopped before damage occurs to either the obstruction or the part-handling device.

It is another purpose and advantage of this invention to stop an automatic positioning machine before damage occurs due to engagement on an unanticipated obstruction so as to prevent down time and damage.

It is another purpose and advantage of this invention to provide an obstacle detector which detects obstacle engagement in either of the three orthogonal positioning axes.

It is another purpose and advantage of this invention to provide an obstacle detector which can be mounted between the arm of the positioning machine and the part-handling device so that the obstacle detector has substantially universal value in such equipment.

It is a further purpose and advantage of this invention to provide an obstacle detector which can be attached to the arm of a robot which is capable of multiple axis motion and positioning so as to position parts as located on the X-, Y- and Z-axes, including rotation about the Z-axis.

Other purposes and advantages of this invention will become apparent from a study of the following portion of this specification, the claims and the attached drawings.

DESCRIPTION OF THE PREFERRED EMBODIMENT

Figure 1:
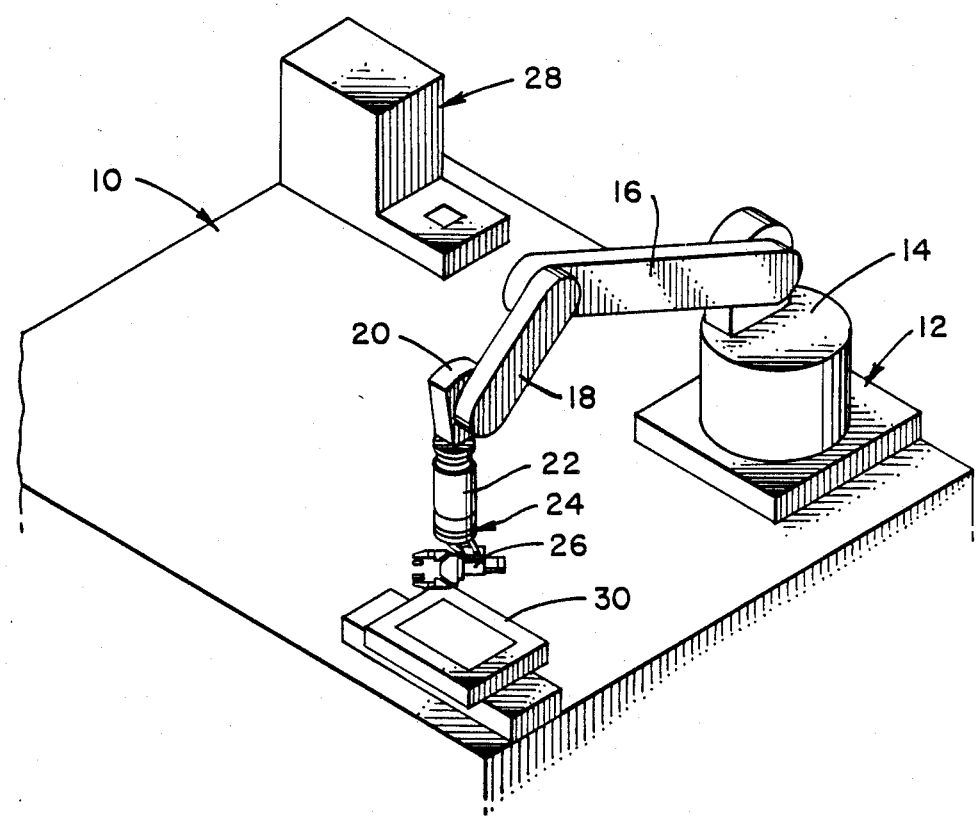
FIG. 1 is an isometric view of an assembly system which incorporates the obstacle detector of this invention.

In FIG. 1, an assembly station is generally indicated at 10. The assembly station has a programmable positioning and assembly device which may be called a robot. The robotic assembly device is generally indicated at 12. The robot has a stand 14 which is rotatable upon a vertical axis on its base, which is in turn secured on the table of the assembly station 10. The robotic assembly device 12 has arms 16, 18 and 20 successively pivoted to each other. Robot arm 20 has mounting plate 22 on its end. The face of the mounting plate 22 is the face upon which the obstacle detector 24 of this invention is mounted. The pickup and handling device 26 is in turn mounted on the obstacle detector. It can be seen that the robot can position the pickup device anywhere in X, Y and Z coordinates, using the top of the assembly station as a reference. In addition, the mounting plate 22 rotates around an axis, which is the Z-axis when positioned as shown in FIG. 1. The rotational axis of the mounting plate 22 can be angularly moved with respect to the Z-axis. Each of the robot arms can pivot. The position of the arms is sensed and the position can be fed-back, so that the mounting plate can be controlled or moved into a desired position. For automated assembly, these position signals are provided by computer control.

Dispensing station 28 is positioned at the assembly station. The dispensing station 28 dispenses electronic components which can be picked up by the pickup device 26 and moved to a selected position. Printed wiring board 30 is the location on which the electrical components will be placed, with the leads against the printed wiring board for soldering at a particular location with respect thereto. Thus, electrical components are picked up by the pickup device 26 at the dispensing station 28 and these electrical components are carried to the printed wiring board 30 and held thereon while they are attached thereto. Attachment may be by reflow soldering when solder heater bars are held in contact with the leads while the leads are held against the printed wiring board.

As the pickup device 26 moves from place to place, from the dispensing station to the location of placement, the pickup device may run into an obstruction. The obstruction may be an unexpected structure in the path of motion; it may be incorrect programming of the path; or it may be a mechanical failure such as a breakdown in an arm position detector. The obstacle may be the printed wiring board or one of the components mounted thereon. A consequence of the pickup and handling device running into something may be damage to the pickup and handling device, to the robot positioning machine moving the pickup and handling device and/or to the obstacle which is struck by the pickup and handling device. When the obstacle is a printed wiring board, the value thereof can be quite significant. Therefore, it is desirable to stop motion of the robot positioning machine before damage occurs. The obstacle detector 24 detects lateral and vertical forces which result from the pickup and handling device engaging an unexpected obstruction.

Figure 2:
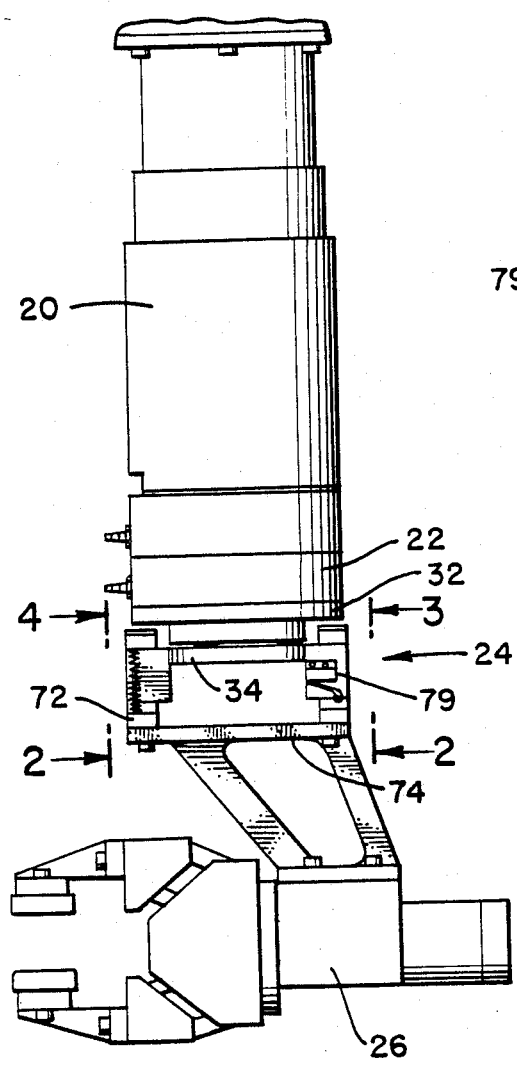
FIG. 2 is a side-elevational view of the lower portion of the arm of the positioning machine, the handling device and the obstacle detector of this invention therebetween.
Figure 5:
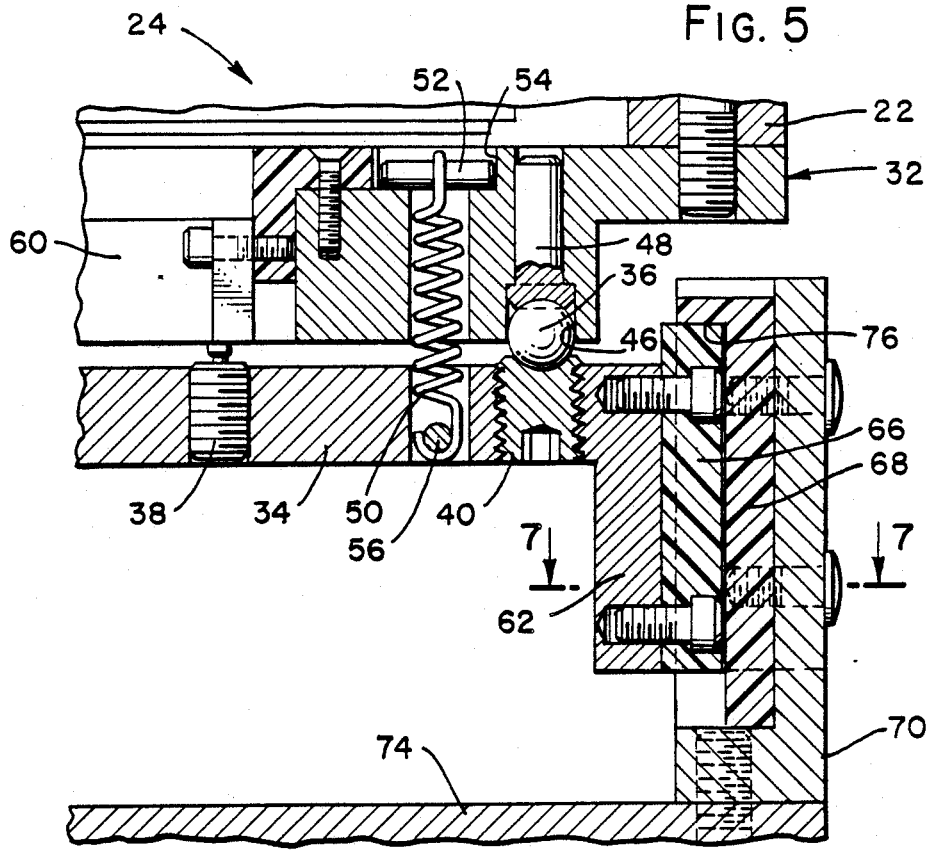
FIG. 5 is a further enlarged sectional view, as seen generally along the line 5—5 of FIG. 3, with parts broken away.

Upper plate 32 of the obstacle detector secures directly on the mounting plate 22 of the robot positioning machine, as seen in FIGS. 2 and 5. One bolt is shown in FIG. 5, for demountable attachment of the obstacle detector. Center plate 34 is mounted directly below upper plate 32. The center plate is arranged so that it is held in a centered position, but can be laterally displaced with a slight lateral force. The center plate is located in a precise position by means of three balls, one of which is seen at 36 in FIG. 5. These three balls are locating balls and define the neutral position of center plate 34. The three balls are equally angularly spaced around the central axis of center plate 32, which is defined by actuator screw 38. The three balls engage in conical noses of three set screws 40, 42 and 44. The three balls rest in pockets which are defined by a hole 46 of diameter equal to the ball diameter and a hardened seat insert 48 for precisely supporting the ball. If desired, the ball could be formed as a dome on insert 48. The set screws are aligned to the opposite holes and seat inserts so that each of the three balls is fully engaged in its conical recess in its set screw at the same time. The center plate 34 is resiliently held up against the balls by means of a plurality of tension springs, one of which is indicated at 50 in FIG. 5. At least three tension springs are used, and the tension springs extend through aligned holes in the upper plate 32 in center plate 34. As is seen in FIG. 5, upper cross pin 52 is engaged by the upper loop in the spring and rests in a socket recess 54 in the top of upper plate 32. The lower cross pin 56 engages in a slot which crosses the lower end of the spring hole.

Figure 6:
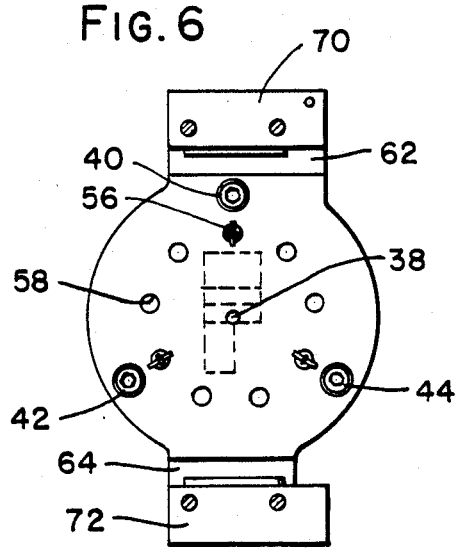
FIG. 6 is an upwardly looking view of the bottom of the obstacle detector, as seen generally along the line 6—6 of FIG. 4.
Figure 7:
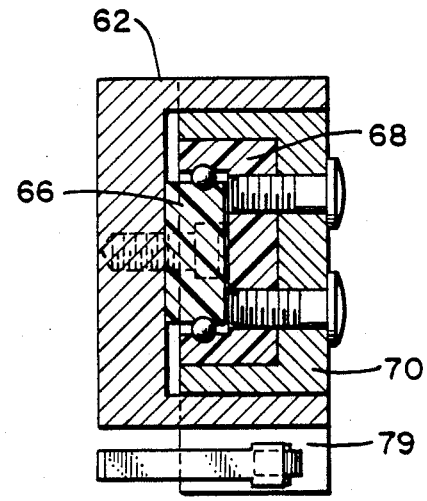
FIG. 7 is a downwardly looking section, as seen generally along the line 7—7 of FIG. 5.

Three springs are shown and three springs are enough to hold the center plate upward in place. However, pickup and handling devices of different sizes and weights may be attached to the obstacle detector. The total tension of the springs 50 must be sufficient to support the weight of the lower portion of the obstacle detector plus the weight of the pickup and handling device 26. For that reason, while three springs are shown in FIG. 6, there are nine spring openings. One of the unused spring openings is indicated at 58. Sufficient springs are used to support the weight.

Lateral force on center plate 34 causes the lateral shift of the center plate As a consequence of the conical socket in the top of each set screw, this lateral shift causes the center plate 34 to move downward with respect to upper plate 32. This downward motion is detected by switch 60, which is engaged by actuator screw 38. The actuator screw 38 is adjusted so that any slight downward motion of center plate 34 causes switch actuation. This switch in turn is connected to the control of the robot positioning machine to immediately stop the motion of arms on the positioning machine. Thus, lateral obstructions are sensed.

Figure 3:
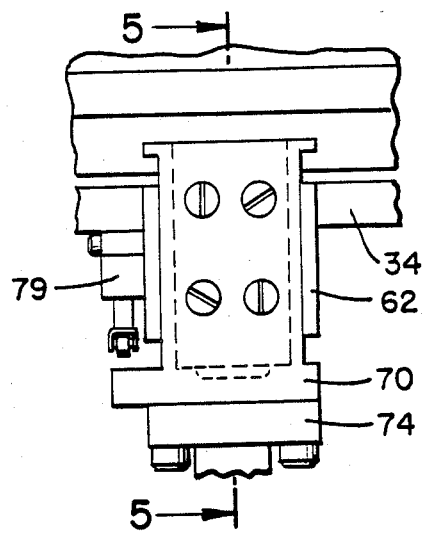
FIG. 3 is an enlarged elevational view, as seen generally along the line 3—3 of FIG. 2.
Figure 4:
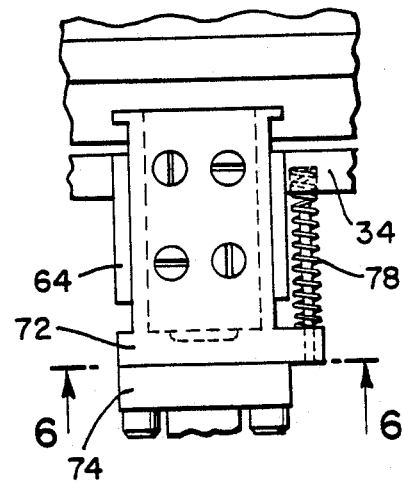
FIG. 4 is an enlarged side-elevational view, as seen generally along the line 4—4 of FIG. 2.

It may be that the pickup and handling device approaches an obstruction downward along the central axis of the obstacle detector. The relationship between the center plate 34 and upper plate 32 is such that it is not sensitive to upward axial forces. For this reason, the obstacle detector also includes vertical slides. U-shaped slide holder 62 is formed as part of the center plate 34 on one side of the vertical axis, and U-shaped slide holder 64 is parallel thereto and uprightly positioned on the opposite side of the central axis. The inner ball slide member 66 is secured within the U-shaped slide holder. Outer ball slide member 68 is engaged therewith and is supported within upright holder 70. The upright holder 72 is seen at the opposite side of the axis of the obstacle detector in FIGS. 4 and 6. The foot 74 is the upper mounting structure of the pickup and handling device 26 and is secured to both of the holders 70 and 72. As is seen in FIG. 5, the outer ball slide member 68 has a stop shoulder 76 which engages on the top of inner ball slide member 66 to define a lowermost position of the outer ball slide member 68 and the holder 70 secured thereto. A similar structure is provided in the opposite ball slide member so as to define a lowermost position of the holders and the foot 74. In order to resiliently extend the holders to the lowermost position, compression springs are provided. Compression spring 78 is shown in FIG. 4 as extending between the lower arm on the lower end of holder 72 and a pocket in center plate 34. A suitable compression spring may be provided on each side, if desired, but the structure is a rigid rectangle so that only one set spring is required. Upward motion, from the lower stop position is detected by switch 79, which engages against the lower arm on the holder 70, as seen in FIG. 3. Two switches could be provided if desired, one on each holder. As is seen in FIG. 3, the switch is mounted some distance from its actuator arm. This permits placement of a part and its resilient downward positioning of the part to hold the part in place during further attachment. This is especially useful in the surface mounting of electrical components on a printed wiring board.

While the obstacle detector has been described with respect to an electronic component pick-and-place machine, it can be seen that it is broadly of value for other kinds of assembly, for material handling, and parts inspection tools in conjunction with conventional powered work heads or industrial positioning robots. If the tool or handling device encounters any unforeseen obstacle, the obstacle detector acts to immediately stop the work head or robot so that there is no damage. The circuitry can be arranged so that, when the obstruction is removed, the drive system is automatically reset, without requiring reprogramming. The obstacle detector is of low profile so that it takes up little space, and it comes back exactly to its original position after displacement so as to continue precise positioning. It permits a predetermined amount of free vertical travel and can be adjusted for a wide range of parts handling devices to be attached thereto.

This invention has been described in its presently contemplated best mode, and it is clear that it is susceptible to numerous modifications, modes and embodiments within the ability of those skilled in the art and without the exercise of the inventive faculty. Accordingly, the scope of this invention is defined by the scope of the following claims.

What is claimed is:

1. An obstacle detector comprising:
a first member and a second member, one of said members being for attachment to a moving machine and the other of said members being for carrying a handling device thereon, an axis through said first and second members;
means interengaging said first and second members for resiliently retaining said first and second members in a neutral position, wherein said resilient interengaging means between said members comprises first, second and third projections mounted in one of said members and first, second and third substantially conical projection-receiving sockets in the other of said members, in which said projection is seated in a set screw engaged in a said second member so that adjustment of said screw adjusts the positions of said projection with respect to said second member, said projections lying substantially in a plane which is normal to said axis so that lateral motion forces said projections out of their sockets, and there is a plurality of tension springs interengaged between said first and said second members for resiliently urging said projections into said sockets so that the number of springs engaged between said first and said second members can be related to the weight of the handling device attached to said second member; and;
means connected between said first and second members for detecting when one of said members moves with respect to the other of said members for indicating impact with an obstruction and for connection for stopping motion of said positioning machine wherein said detecting means comprises a switch interengaged between said first and said second members so that forcing said projections out of said sockets causes switch actuation.

2. The obstacle detector of claim 1 wherein said conical projection-receiving socket in which said projection is seated is in a set screw engaged in said second member so that adjustment of said set screw adjusts the position of said projection with respect to said second member.

3. The obstacle detector of claim 1 further including at least first and second slides mounted on said second member and arranged for linear movement substantially parallel to said axis, said first and second slides being configured to receive and support the handling device.

4. The obstacle detector of claim 3 wherein said slides comprise first and second ball slides, said ball slides having a stop shoulder thereon to limit motion of said ball slide in a first direction, said first direction being toward the mounting structure for said handling device so as to limit motion of said handling device away from said first member.

5. The obstacle detector of claim 4 further including a switch for detecting motion of said slide so that upon predetermined motion of said slide, said switch signals obstruction of said handling device.

6. The obstacle detector of claim 5 wherein a spring resiliently urges said slide so that said slide stop is resiliently engaged.

7. The obstacle detector of claim 4 wherein said means for resilient interengagement between said members comprises first, second and third projections mounted in one of said members and first, second and third substantially conical projection-receiving sockets in the other of said members, said projections lying substantially in a plane which is normal to said axis so that lateral motion forces said projections out of their sockets, said sensing means comprising a switch interengaged between said first and second members so that forcing said projections out of said sockets causes switch actuation.

8. The obstacle detector of claim 7 wherein said means interengaging said first and second members includes a spring interengaged between said first and second members for resiliently urging said projections into said sockets.

* * * * *